United States Patent
Cosby

[15] 3,687,484
[45] Aug. 29, 1972

[54] LIFT TRUCK WITH OVERHEAD GUARD AND COUNTERWEIGHT

[72] Inventor: Henry L. Cosby, Hickory Corners, Mich.

[73] Assignee: Clark Equipment Company

[22] Filed: May 5, 1970

[21] Appl. No.: 34,713

[52] U.S. Cl.........280/150 C, 214/38 CA, 280/150 E
[51] Int. Cl..............................................B60r 21/00
[58] Field of Search.........280/150 C, 150 E; 296/65; 212/49; 214/127, DIG. 7

[56] References Cited

UNITED STATES PATENTS

| | | |
|---|---|---|
| 3,289,871 | 12/1966 | Tourneau et al.......280/150 C |
| 2,911,232 | 11/1959 | Hastings et al.........280/150 C |
| 3,517,941 | 6/1970 | Lazzeroni...............280/150 E |
| 3,502,368 | 3/1970 | Maxa.....................280/150 C |
| 3,463,542 | 8/1969 | Daniels........................296/65 |
| 3,191,400 | 6/1965 | Swenson......................296/65 |

Primary Examiner—Gerald M. Forlenza
Assistant Examiner—Lawrence J. Oresky
Attorney—Kenneth C. Witt, John C. Wiessler and Robert H. Johnson

[57] ABSTRACT

A lift truck is shown to exemplify the invention in which a seat support member is pivoted at one side to allow the seat to be swung outwardly of one side of the truck to a non-interfering location relative to a compartment housing the power source apparatus, such as an electric storage battery. A protective overhead guard device includes one pivotable and longitudinally adjustable connector and one longitudinally adjustable connector for adjusting the length of the guard for connection to a longitudinally adjustable and novel counterweight structure at different adjusted positions thereof, thereby enabling the same truck chassis to be utilized for a relatively wide range of lift truck capacities. In addition, the pivoted connector is adapted to provide an opening in the guard structure through which may pass a chain or cable of a lifting and transfer device which, with the pivoted seat structure, provides simple means for performing an efficient method of removing and replacing the power source or other devices without removing or disassembling the overhead guard or seat structure.

6 Claims, 11 Drawing Figures

INVENTOR
HENRY L. COSBY

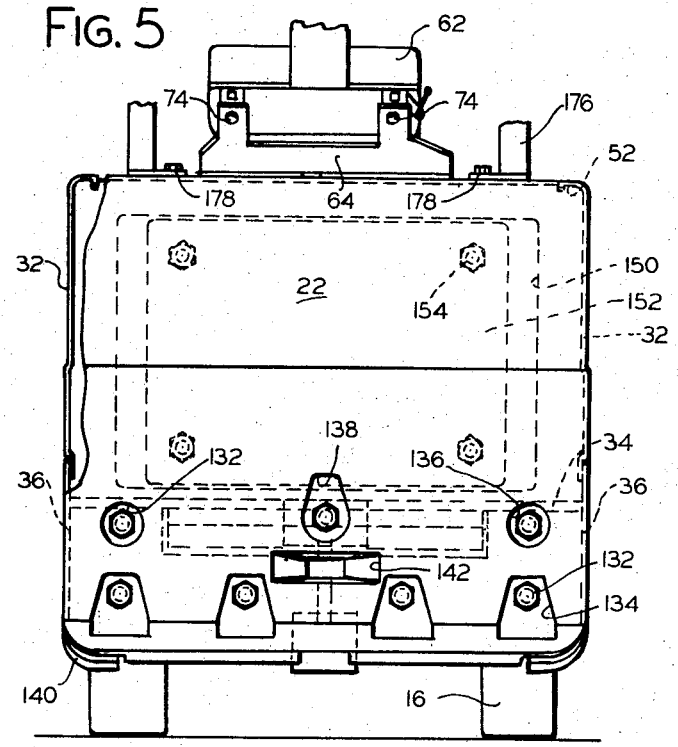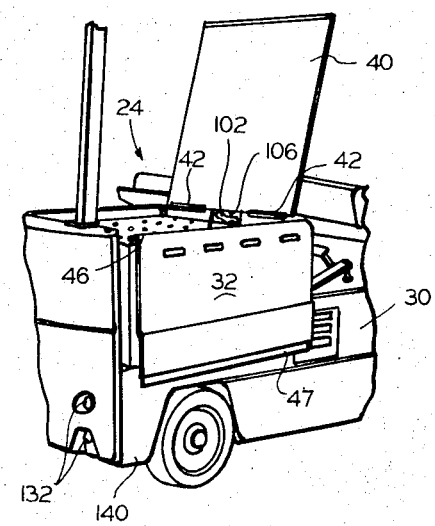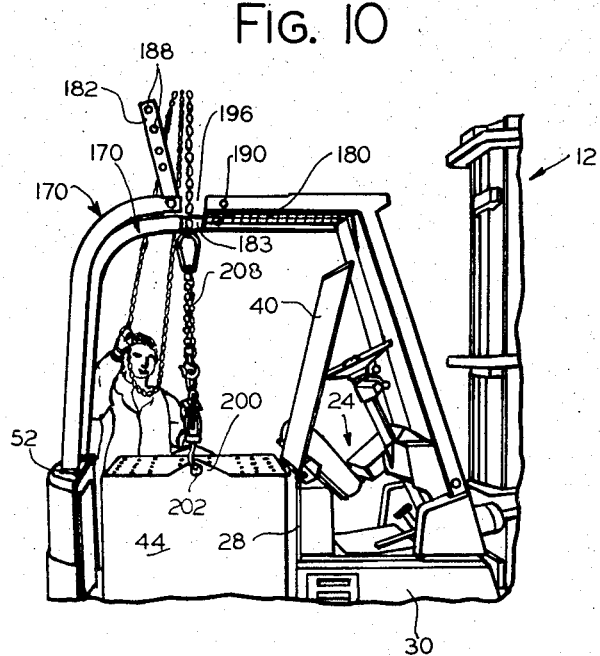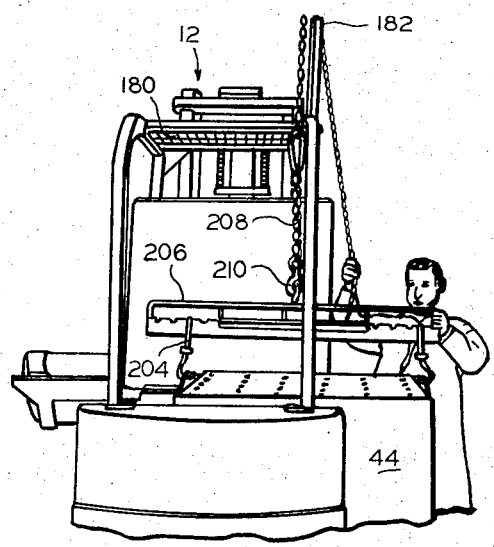

PATENTED AUG 29 1972

*INVENTOR*
HENRY L. COSBY
BY
ATTORNEY

LIFT TRUCK WITH OVERHEAD GUARD AND COUNTERWEIGHT

BACKGROUND OF THE INVENTION

The field of art to which this invention relates includes vehicular adjustable chassis, protective guards, adjustable seat structure and associated body structure.

In vehicles known as lift trucks, for example, an operator's control station is normally provided adjacent the forward end of the truck and a power source, such as a battery or internal combustion engine (hereinafter referred to frequently as a "battery" for convenience only, and not by way of limitation), is disposed in the rear portion of the truck. The operator's seat is normally disposed above at least a portion of the compartment which houses the battery or other power source so that when it is desired to remove the battery, for example, by lifting it up and out of the truck chassis it is first necessary that the seat be moved to a non-interfering location, either by dismounting it from the truck or otherwise. In some lift truck designs the seat can be pivoted forwardly sufficiently to permit the battery to be lifted from the truck without interference. In other lift truck designs the position of the steering wheel in relation to the seat is such that the seat cannot be pivoted forwardly far enough to permit the latter operation. In still other prior truck designs provision is made for swinging the seat to one side of the truck and then upwardly and forwardly so as to permit removal of the battery. One such swingable seat construction is disclosed in U.S. Pat. No. 3,463,542, granted Aug. 26, 1969.

Driver overhead guard structures have generally been adopted as standard equipment on lift trucks as produced by many manufacturers, including the assignee hereof, for the protection of operators under specified conditions from falling objects. In order to enable a battery or other power source to be lifted and removed from the truck without interference by such guard structure it has been proposed heretofore to pivot a portion of the upper bridge part of the guard so as not to interfere with removal of the battery from the truck. One example of a prior guard structure and a method of manipulating same for the above purpose is disclosed in U.S. Pat. No. 3,455,599, granted July 15, 1969. Other of assignee's U.S. patents which disclose other types of guard structures enabling access to such vehicular compartments are U.S. Pat. Nos. 2,911,232, granted Nov. 3, 1959, 3,289,871, granted Dec. 6, 1966, and 3,336,074, granted Aug. 15, 1967.

It is of known advantage in the counterbalanced lift truck art to maximize standardization of chassis design within a given range of truck lifting capacities, for example, from 6,000 to 8,000 pounds, by including means for adjusting the truck frame or counterweight in a longitudinal direction as a function of the maximum load to be handled in any given truck operation. Various constructions have heretofore been devised for this purpose, a relevant one of which is disclosed in assignee's U.S. Pat. No. 3,061,034, granted Oct. 30, 1962.

SUMMARY OF THE INVENTION

The present invention comprises a substantial improvement over each and all known prior chassis constructions which include any one or a combination of the above-specified elements.

A primary object of the invention is to provide an improved driver's overhead guard device for vehicles which provides adjustment means for varying the effective length thereof. The guard may also be used in combination with a longitudinally adjustable counterbalance or other device so that for any given adjusted location of the counterbalance or device within a predetermined range the guard device may be adjusted to maintain a connected relationship to the counterbalance or device.

Another object is to provide a longitudinally adjustable driver's overhead guard for a vehicle including means to provide an opening through one side thereof so that, for example, hoist means may pass through the opening for engaging and lifting from a vehicular compartment a power source or other device.

An additional object is to provide an improved swing-out operator's seat construction.

Still another object is directed to an improved counterweight construction and means for adjusting the same longitudinally of the vehicle.

Other more particular objects and features of the invention will be apparent to those skilled in the art from the following description and drawing forming a part hereof.

BRIEF DESCRIPTION OF THE DRAWING

FIG. 5 is a partial rear elevational view of the truck as shown in FIG. 1;

FIG. 9 is a partial rear quarter perspective view of the truck of FIG. 1 showing a cover hood of the battery compartment in a raised position and a side panel portion in exploded view in relation to the one side of the truck for opening or exposing that side when the battery is to be removed or installed; and FIGS. 10 and 11 are partial side and rear perspective views, respectively, illustrating a method of removing from a lift truck power source equipment, viz., an electric storage battery as illustrated.

DESCRIPTION OF THE PREFERRED EMBODIMENT

Figure 1:
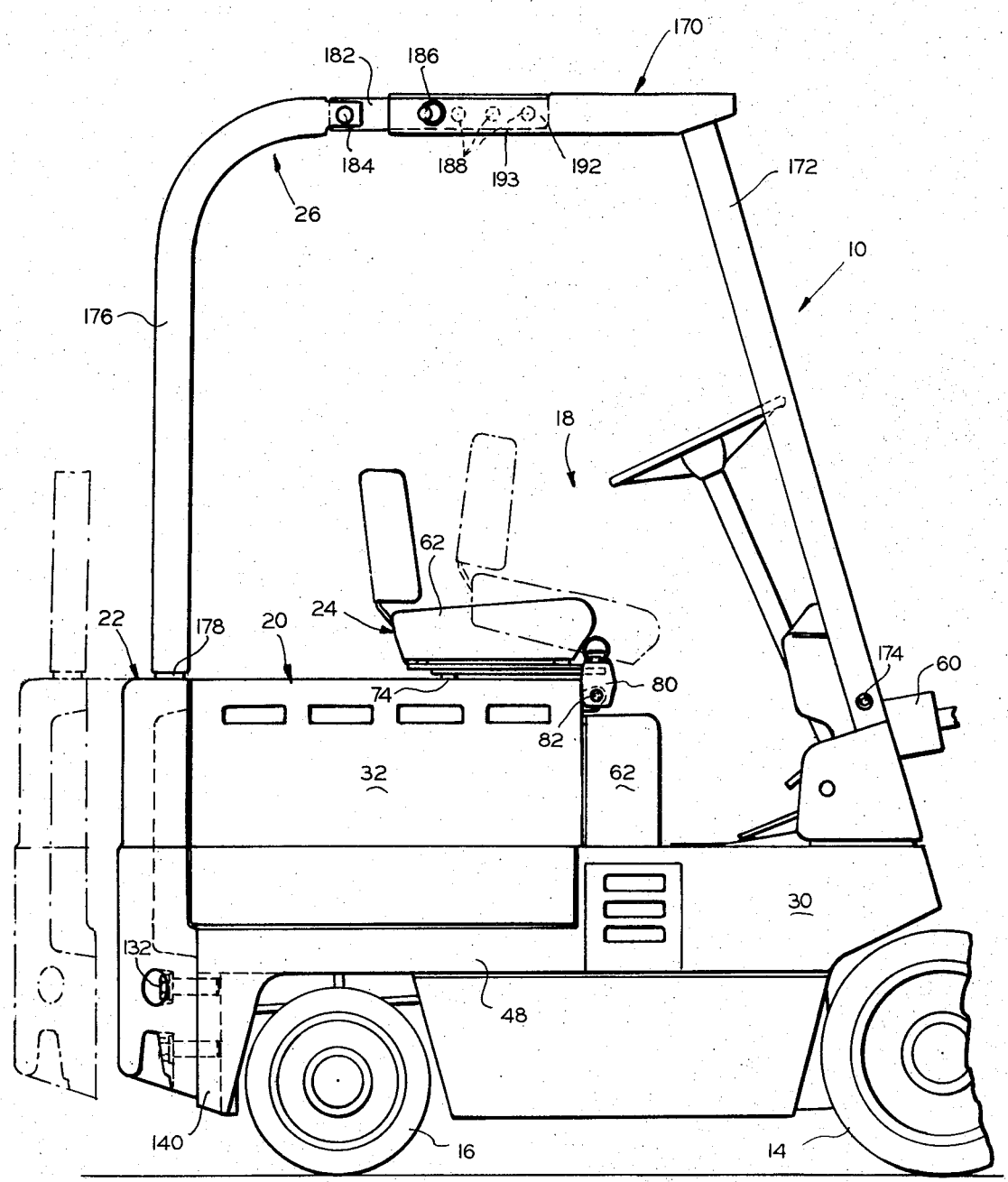
FIG. 1 is a partial side view in elevation showing my invention as applied to an electric powered industrial lift truck.

Referring now to the drawing, numeral 10 designates an electric counterbalanced lift truck which includes a lifting mast assembly 12 (FIGS. 10 and 11) mounted from the front axle and of generally conventional design having a lifting carriage and fork (not shown) mounted for vertical movement thereon, forward drive wheels 14, rear steer wheels 16, an operator and control station 18, and a battery compartment 20 formed generally within the body, a main frame and adjustable counterweight 22 of the truck and beneath an operator's swing-out seat assembly generally designated at 24. An adjustable overhead guard assembly is illustrated generally at numeral 26.

The battery compartment 20 is formed longitudinally between the forward surface of the counterweight assembly and a vertical transversely extending front body plate member 28 secured at opposite ends to longitudinal truck frame members 30, is formed laterally between manually demountable vertical longitudinally extending side plate members 32, and is formed vertically between a battery support floor and truck frame member 34 which is secured at its longitudinal and forward transverse edge portions to longitudinal and transverse truck frame members. The top of the battery compartment is normally closed by a hood plate 40 suitably hinged at 42 (FIGS. 9 and 10) to forward plate 28 for forward pivotal movement when seat assembly 24 is located in the swing-out position shown in FIG. 2 and other figures, as will be described in detail below, to provide access to the storage battery 44 which is in operation located in the compartment and supported by floor portion 34. Suitable notches 156 are provided at each upper corner portion in the forward face portion of the counterweight and in plate 28 for receiving the ends of an upper turned or hooked over edge portion 46 of each side plate 32 which, when mounted, covers each open side portion of the battery compartment between the counterweight and the forward transverse plate member 28. Formed longitudinally along the lower portion of each side plate 32 is a recessed section 47 (FIG. 9) of lesser thickness which is adapted to slide behind and register with side body member 48 while the upper hooked edge portion 46 registers as aforesaid in notches 156. The side plate construction is duplicated on each side of the truck and during battery removal and installation both side plates 32 are removed.

The operator's station 18 includes the usual lift truck controls such as a steer wheel 56, instrumentation panel 58, lift, lower and tilt controls for the mast assembly 12, accelerator and brake controls, and forwardly located mast tilt cylinders 60, truck motor control circuitry being housed in the compartment within cover 62 immediately adjacent forward body plate 28, none of said truck controls or operating devices being of relevance insofar as the present invention is concerned.

The pivotable swing-out operator's seat assembly 24 comprises an important part of the invention and will now be described in detail. It is illustrated in various positions of operation in FIGS. 1–4 and 10. The seat per se is denoted by numeral 62 and may be of conventional design preferably embodying spring type cushions for driver comfort. It is mounted for forward and rearward sliding adjustment on a seat carrier plate 64 by conventional T-shaped slotted track means 66 secured at opposite sides of the bottom surface of the seat and in registry with out-turned flanges of fixed tracks 68 which are secured to the body supporting plate 64. Spring loaded hand-operated linkage means 72 of known construction is operable to release the seat structure for forward and rearward sliding adjustment as movable track portions 66 are actuated along fixed track portions 68 for adjustment in the manner indicated in FIG. 3 by the solid line and broken line showings of the backrest portion of the seat.

Figure 2:
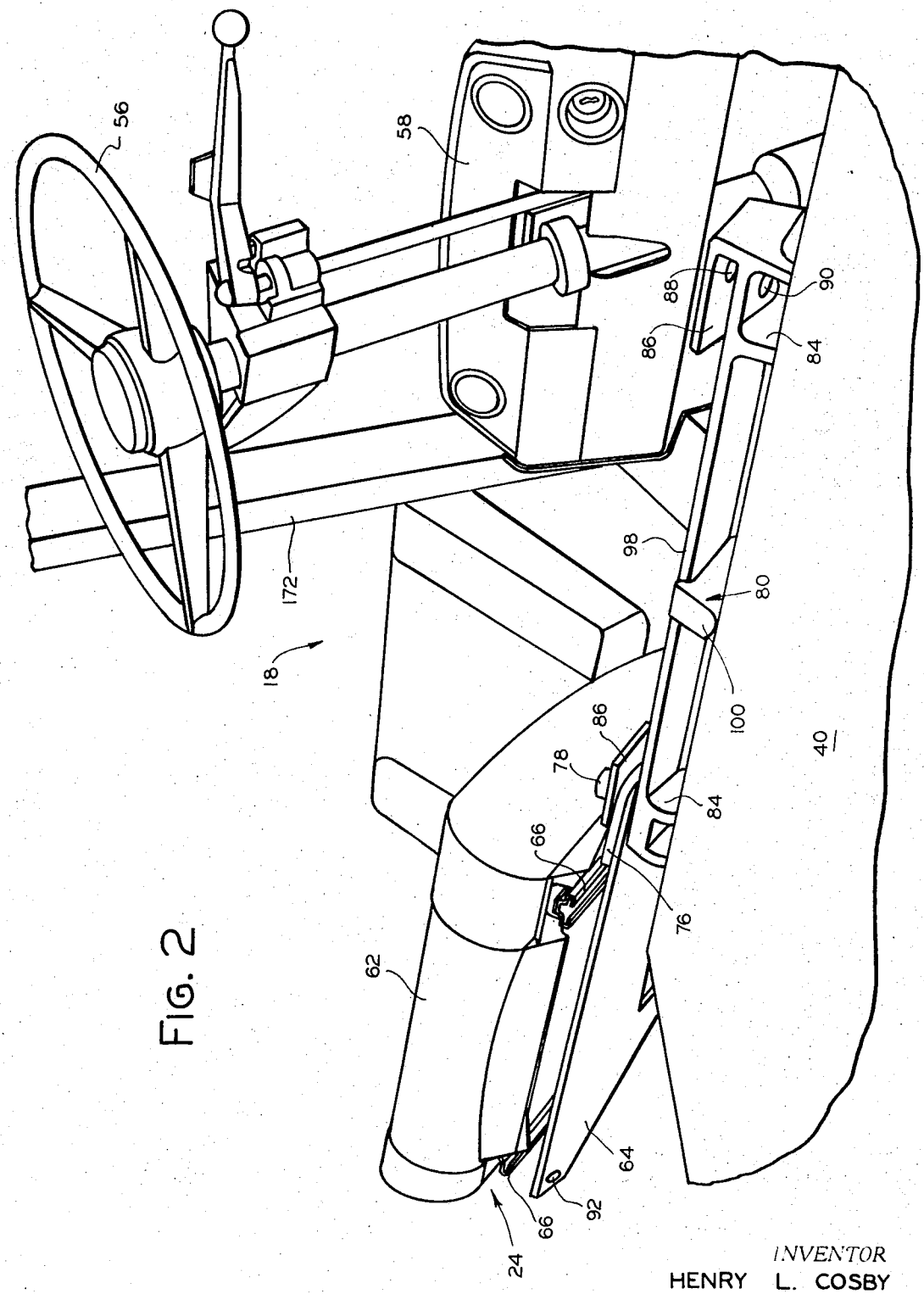
FIG. 2 is an enlarged perspective view showing a portion of the driver's station of FIG. 1 wherein the operator's seat has been actuated to a full outwardly pivoted location relative to the station.
Figure 3:
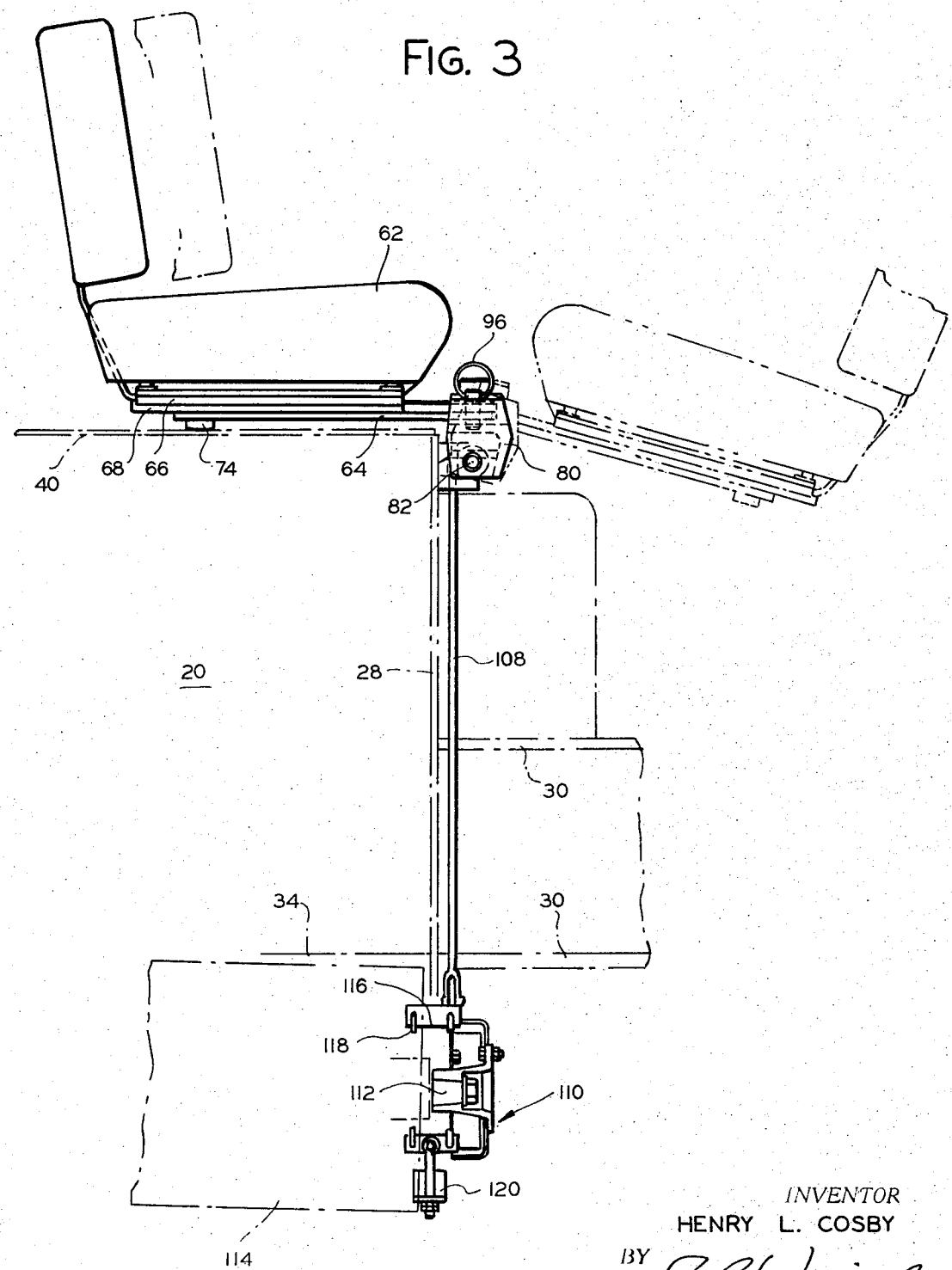
FIG. 3 shows in partial phantom view a broken-away side portion of the operator's station wherein the driver's seat is illustrated in both operative and swung-out positions in relation to the station and in relation to a drive motor brake device.
Figure 4:
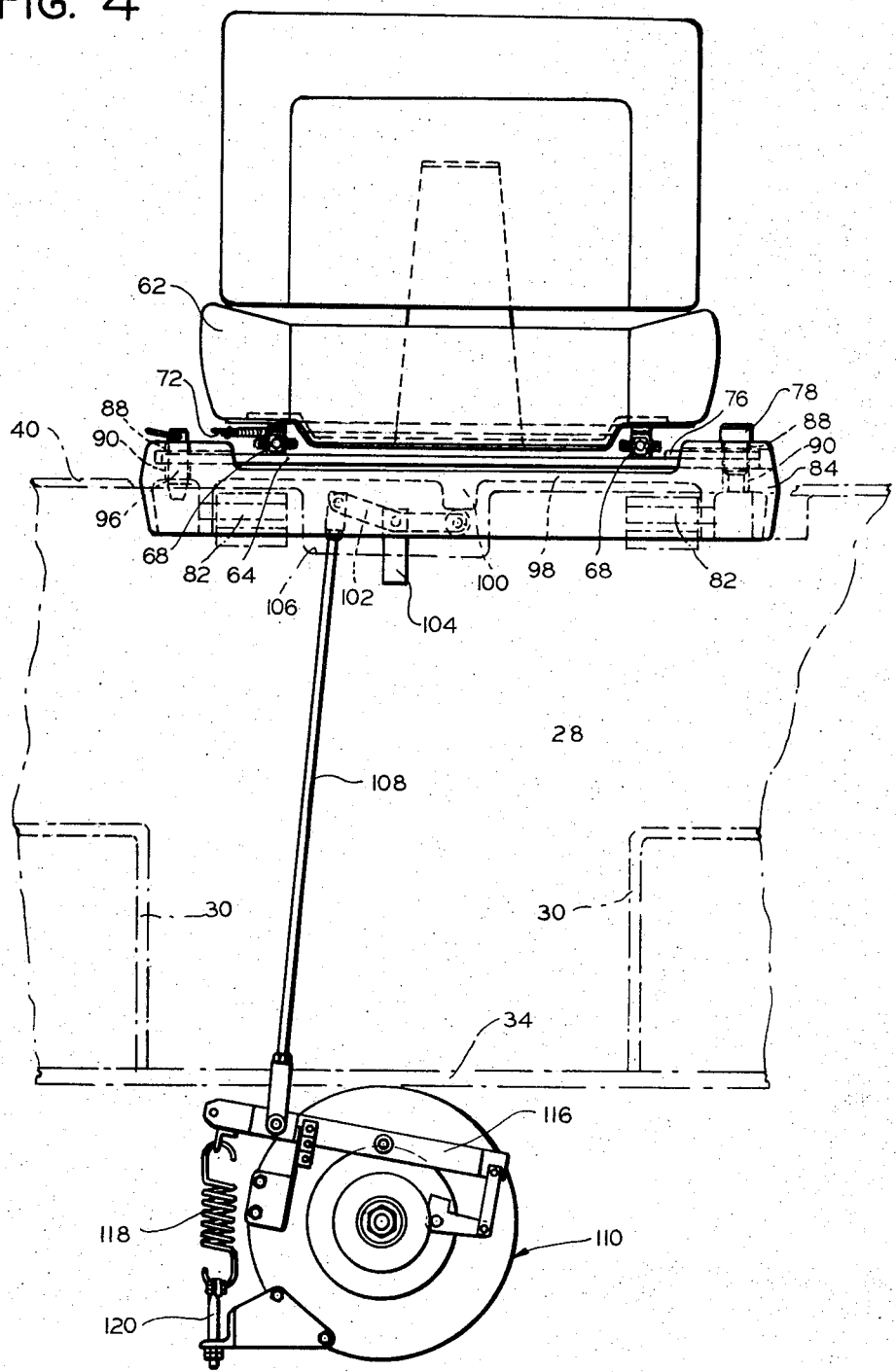
FIG. 4 is a front view of FIG. 3 which shows the operator's seat only in its normal operative position with the seat brake actuated to a disengaged position.
Figure 6:
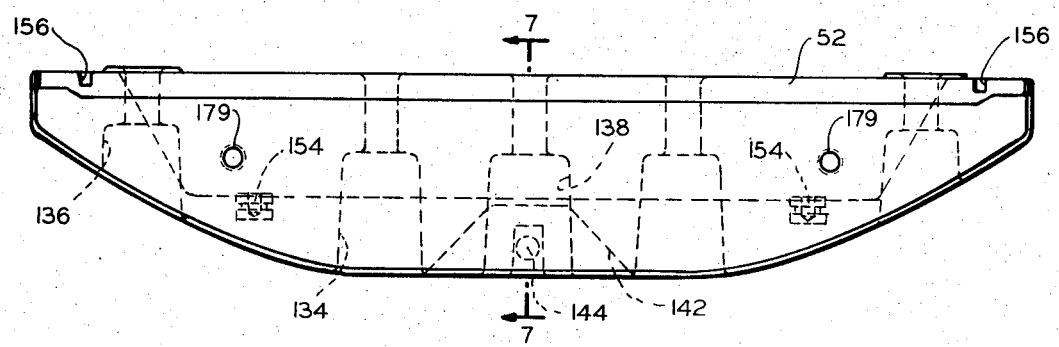
FIG. 6 is a plan view of the counterweight structure shown in FIG. 5.

Seat support plate 64 is of a generally U-shaped configuration, as best shown in FIG. 5, having short cylindrical support buttons 74 adjacent the outer ends of the legs of the plate for supporting the plate in a position generally parallel to and spaced vertically from hood member 40 when an operator is located on the seat, which is the position of the seat shown in solid lines in FIGS. 1, 3 and 4. Plate 64 has a front left corner reinforcing and spacer plate portion 76, which corner portion is pivotally mounted by a pivot pin 78 from the left end portion of a transversely extending seat assembly mounting casting 80 which is supported for forward pivotal movement about a pair of transversely spaced horizontal pivot pins 82 from a normal operating position thereof as shown in FIG. 1 to a forwardly pivoted position thereof as best shown in FIG. 2. Mounting member 80 includes generally inverted U-shaped end bracket portions 84 having vertically spaced and inwardly extending corner plate portions 86 mounted from each said bracket portion 84 and axially aligned openings 88 and 90 formed in the respective spaced plate portions at both ends of seat mounting 80. Complementary openings 92 are formed in opposite front corner portions of plate 64, said pivot pin 78 being mounted to extend through the respective openings 88, 90 and 92 for swinging movement of the seat assembly to and from the left side of the truck, a locking pull-out pin and hand ring 96 being registrable with right side openings 88, 90 and 92 when the seat plate 64 is in normal operating position in the space between upper and lower plate portion of right end bracket 84, said pin 96 maintaining the seat in said position except, of course, when the pin is removed for pivoted swing-out operation of the seat as shown. Mounting member 80 includes a connecting top plate member 98 between the end brackets 84 and a central downwardly extending projection 100 adapted to operate a safety brake on the truck to engage the truck motor shaft for braking whenever the operator vacates the seat. The brake is disengaged when the operator is located on the seat, the brake per se being of conventional design as generally shown in FIGS. 3 and 4. The type of brake shown is generally denoted as a "dead man" brake.

When the seat assembly is in the position shown in solid lines in FIGS. 3 and 4 for operation of the truck the weight of the operator pivots the seat assembly with mounting member 80 about support pins 82 in a counterclockwise direction as seen in FIG. 3 such that projection 100 abuts a lever 102 which is mounted from a bracket 104 secured to forward body plate 28 in a U-shaped cutout portion 106. A link 108 is pivotally connected to the opposite end of lever 102 for operating a conventional internal expanding shoe cam and lever actuated drum brake shown generally at 110 which is mounted from the chassis below the battery supporting floor 34 for braking the shaft 112 of the truck electric drive motor 114. A main brake actuating lever 116 is connected to link rod 108 and is actuated to apply the brake by a tension spring 118 connected at its fixed end to a chassis mounted bracket 120 and at its movable end to the one end of lever 116. When the operator is seated clockwise actuation of lever 116 (FIG. 4) releases the brake by extending spring 118, whereas when the operator departs the truck brake spring 118 actuates the linkage assembly to disengage the brake which spring action also effects forward pivotal movement of the entire seat assembly and mounting 80 therefor through link and lever 108, 102 operating upwardly against projection 100, the spring 118 having sufficient force to actuate lever 102 counterclockwise to pivot the entire seat and mounting structure forwardly about pins 82. The seat is shown in such a forwardly pivoted position in broken lines in FIG. 1 and also in FIGS. 2 and 5. The construction of brake assembly 110 per se is not a part of this invention, and is not therefore described in detail herein.

With the seat 62 swung-out on plate 64 to the approximate 180° transversely displaced position best illustrated in FIGS. 2 and 3, it is apparent that hood member 40 can be elevated as shown in FIGS. 9–11, thereby exposing the top side of battery compartment 20, and that each side plate member 32 can be readily removed manually from the connection thereof to forward plate 28, longitudinal chassis member 48, and the counterweight notch 156, thereby exposing also the sides of the compartment.

The counterweight construction shown in FIGS. 1 and 5–7 comprises a cast or fabricated mass of metal 130 supported from the rear end of the truck for the well-known purpose of counterbalancing loads supported forwardly of the front drive axle for elevation on mast 12. The counterweight as shown is secured to the truck by seven studs 132 mounted in various shaped cavities 134, 136 and 138 in the rear portion of the counterweight, which cavities permit recessing of the stud heads and access thereto for removal. A recess adapted to receive a tow bar end is formed centrally of the counterweight and is associated with axially aligned vertical openings 144 which extend downwardly from recess 138 for receiving a tow bar connector pin, not shown. Studs 132 connect the counterweight to a downwardly extending apron 140 of the truck frame having tapped openings formed therein which are adapted to align axially with the corresponding openings 134, 136 and 138 of the counterweight.

Figure 7:
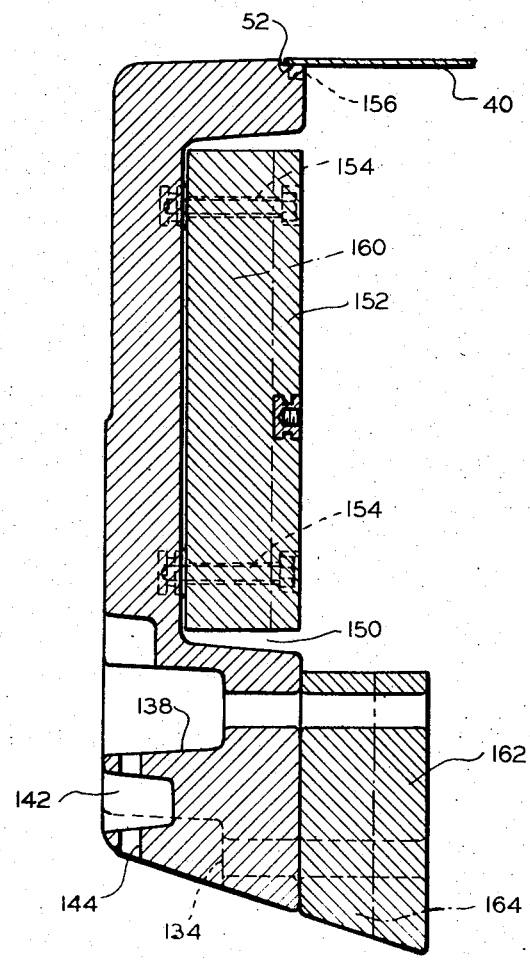
FIG. 7 is a sectional view taken along line 7—7 of FIG. 6 and showing also means associated therewith for adjusting the spacing of the counterweight from the main truck chassis and for varying the mass of the counterweight.

A generally rectangular shaped recess 150 is formed inside the counterweight for receiving any selected one of a plurality of supplementary counterweight slabs, as may be required for different capacity trucks, which slabs are secured to the inner transverse surface portion of the recess by four studs such as 154. A recessed edge portion 52 of the counterweight may be observed well in FIG. 5, notches 156 at either side of the counterweight being formed in said recessed portion 52. The thickness and weight of a relatively large supplementary counterweight 152 may be varied as aforesaid in the manner indicated, for example, counterweight portion 160 of thinner cross-section than 152 as represented by the broken line in FIG. 7, which is also adapted to be secured in the recess 150 by studs shorter than 154. For relatively small capacity trucks it is desirable to use no supplementary counterweight in recess 150, and for such small capacity trucks the counterweight is ordinarily secured directly to apron 140 without the use of intermediate spacer members such as illustrated in FIG. 7 at numerals 162 and 164. The broken line in the spacer in FIG. 7 represents the outer boundary surface or thickness of spacer 164, which is adapted to be used in conjunction with supplementary counterweight 160. For example, a 6,000 pound capacity truck may be designed to utilize no supplementary counterweight and no spacer member, whereas a 7,000 pound capacity truck may utilize supplementary counterweight 160 and spacer member 164, and an 8,000 pound capacity truck may utilize the largest supplementary counterweight 152 and the longest spacer member 162. The counterbalancing effect, of course, is varied as required for each size of truck. It is understood, of course, that sets of varying length studs 132 and 154 will be utilized as required for the different thicknesses of supplementary counterweights and spacer members. Also, cover or hood member 40 and side plates 32 will be available in various lengths when the truck is being assembled as appropriate for the variable length of compartment 20 depending upon the particular capacity load for which the truck is designed.

The above exemplary variations enable a single basic truck chassis to be utilized for varying load capacity requirements simply be varying the counterweight mass and effective counterbalancing moment arm about the front axle, as described above. Also, it should be noted that the battery compartment floor member 34 is located to rest on the spacer members so that electric storage batteries, for example, of varying size and capacity can be installed depending upon the truck capacity desired.

Figure 8:
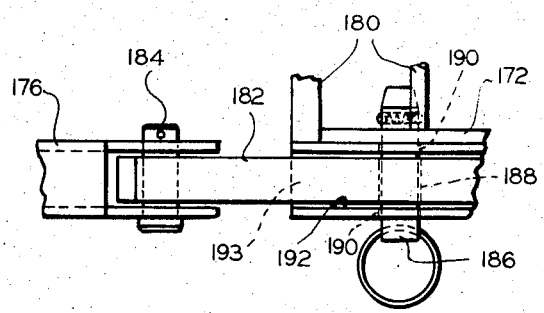
FIG. 8 is an enlarged partial plan view of the connecting link structure associated with one side of the overhead guard.

The overhead protective guard structure 26 comprises a pair of parallel, transversely spaced, generally inverted U-shaped side rail assemblies 170. Each such side rail assembly has a forward rail portion 172 which extends up and over the operator's station and is secured to the respective front side portion of the truck by a stud 174, and a rear rail portion 176 which extends up and over the rear portion of the truck, being secured to the upper surface of the counterweight by a bracket and bolt assembly 178 which connects the rear portions securely to tapped openings 179 formed in the upper end of the counterweight. Forward leg portions 172 are secured together also by a horizontal protective bar grid 180 which terminates at the rear end of rail portions 172. The right side longitudinally aligned pair of front and rear rail portions 172 and 176 are adapted to be connected together by a link 182 which is pivotally secured at its rear end to rear rail 176 by a bolt 184 and which is longitudinally adjustably connectible to the corresponding front rail portion by a pull pin member 186. A plurality of adjustment openings 188 are present in link 182, any one of which may be selected to register with an opening 190 in the rear portion of the respective forward rail portion 172 depending upon the desired adjustment range of the guard assembly 26. The rear portion of right side rail 172 is formed to provide a longitudinally extending U-shaped recess 192 for receiving link 182 in a selected adjusted position longitudinal of the truck. Details of the connecting link 182 and adjacent connected portions of the front and rear protective guard rails 172 and 176 are best shown in the plan view of FIG. 8. It will be noted that link 182 is pivotable upwardly only about pin 184 inasmuch as the slotted U-portion 192 provides a floor 193 providing structural rigidity and strength of the guard equivalent to standard overhead guard construction.

The left side rail portions 172 and 176 are connected together by a link 183 (FIG. 10) which may be of the same construction as link 182 except that link 183 is not pivoted to left rail portion 176, but is secured thereto as by welding, the connection thereof to left rail portion 172 being longitudinally adjustable by means of openings 188 and 190 and a pull pin 186 the same as is link 182. A more rigid guard structure is thus provided than would be the case if, for example, pivoted links 182 were used on both sides of the guard, although such structure may, of course, be found desirable in some cases with the provision of additional support to prevent sagging of the guard in the event both such links were pivoted to provide simultaneously openings 196 on both sides of the guard.

For each available longitudinally adjusted position of counterweight 22 is a corresponding longitudinally adjustable position of the overhead guard 26 so that in any adjusted position of the counterweight as described above the connecting links 182 and 183 are adjusted such that pins 186 and openings 190 register with selected ones of openings 188 whereby bracket and bolt portion 178 of each rail portion 176 is registrable with the corresponding tapped opening 179 in the counterweight.

Thus, in factory assembly of the truck all necessary parts and adjustments are available to provide a completely enclosed power source compartment for any one of a plurality of longitudinally adjustable positions of the counterweight for various capacities of lift trucks. In addition, all of the foregoing described features combine in an extremely novel manner to provide an adjustable length lift truck and overhead guard, and a swing-out seat and one side opening overhead guard whereby to provide in a multi-capacity load lift truck for the removal of the power source, such as the storage battery illustrated, without removing any of the parts of the truck except the readily demountable side plate members 32.

Illustrated in FIGS. 10 and 11 in side and rear perspective views is a lift truck which embodies my invention wherein the various truck parts involved in removal or installation of storage battery 44 are illustrated in operative positions to enable such removal or deposit. The overhead guard is shown conditioned to provide an opening 196 between the right front and rear rail portions, right side pin 186 having been removed from openings 188, 190 and the connecting link 182 located in an upwardly pivoted position as shown. The seat assembly 24 is located in its full outwardly extended position, as previously described, the hood 40 is raised as shown, and the side plates 32 are removed. It will be noted that the overhead guard grid structure 180 fully protects the operator from falling objects extending rearwardly as it does over the seat structure while providing an open rear portion of the guard such that with connecting link 182 pivoted to provide opening 196, an overhead chain or cable fall means and hoist 208 or similar lifting equipment can be lowered between the side rails of the guard and/or actuated to pass through opening 196 transversely to the right side of the truck.

As illustrated in FIGS. 10 and 11 the battery is shown to include side plate members having centrally located bracket portions 200 with openings 202 adapted to receive a pair of adjustable hooks 204 of a fixture assembly 206 which is supported from the overhead chain hoist assembly at 210. The operator, as shown, can under these conditions readily lower the fixture 206 below the upper level of the guard by means of the chain hoist and then actuate the fixture 206 over the battery as the chain passes through opening 196, in which position the connecting hooks 204 of the fixture may be connected to the battery brackets 200 and the chain hoist operated to lift the battery from supporting floor 34 and thence move it transversely outwardly of the truck as the chain fall is actuated through opening 196 and the battery is then located for recharging or other maintenance. In a similar manner and by the reverse procedure a fully charged battery can be very quickly installed in the truck. The removal and replacement of a power source, such as a storage battery or other device, can be accomplished within a very short time.

It will be apparent, as mentioned previously, that my invention is not restricted in application to material handling vehicles, such as lift trucks, or to any particular kind of power source, such as storage batteries, the above-described embodiment merely illustrating a preferred embodiment of the invention. The invention is useful, for example with any vehicle in which a combination of factors exist such as in the above-described lift truck application wherein replacement of power source or other equipment may be relatively difficult and time consuming because of interfering components, such as seat structure, overhead guard structure, and the like.

Also, and most particularly, it is useful with vehicles wherein it is of advantage to make available a longitudinally adjustable overhead guard and a longitudinally adjustable single basic chassis construction. It will therefore be understood and appreciated by those skilled in the art that numerous modifications may be made in the structure, form and relative arrangement of parts without necessarily departing from the spirit and scope of the invention, even though I have described and illustrated only a single embodiment of the invention. Accordingly, it should be understood that I intend to cover by the appended claims all such modifications which fall within the scope of my invention.

I claim:

1. An overhead guard for counterweighted industrial vehicles having an operator's station thereon comprising an inverted generally U-shaped guard extending over the operator's station having the downwardly extending forward legs of the guard connected rigidly to a forward body portion of the vehicle and having the downwardly extending rear legs of the guard connected rigidly to a rear portion of the vehicle, the improvement comprising connecting means forming a part of the upper base or bridging portion of the inverted U-shaped guard and adjustable longitudinally on each side of the guard so that the connecting means can be adjusted to various effective lengths while bridging with said bridging portion the operator's station to form the inverted U-shaped configuration, thereby effecting a plurality of selectable guard lengths for such rigid connection by said forward and rearwad guard legs to a plurality of vehicular lengths, the rear vehicular portion being adjustable to a plurality of preselected positions longitudinal of the vehicle, each such adjustment position having a corresponding longitudinal adjustment position of the overhead guard, the rear legs of the guard being non-pivotably secured rigidly to the said rear portion of the vehicle in each such longitudinally adjusted position thereof.

2. In a vehicle as claimed in claim 1, the vehicle being an industrial lift truck, the rear portion comprises a counterweight, and one side of said connecting means is movable while mounted on the truck to disconnect the forward and rearward guard legs from each other on said one side so as to provide an opening on said one side of the guard through which is movable external means for removing from the truck or depositing therein power source means without removal of the guard from the truck.

3. In a vehicle as claimed in claim 1, the rear vehicular portion comprises a counterweight having a recess or cavity formed in the interior body thereof and a plurality of supplementary counterweight means adapted to be secured selectively in the cavity or recess.

4. An adjustable counterweight construction for lift trucks comprising a counterweight adapted to be connected to the rear chassis portion of a lift truck, a plurality of spacer means varying in length and selectively connectible intermediate the rear chassis portion and the counterweight for selectively varying the spacing of the counterweight from said rear chassis portion, a recess or cavity formed in the interior body of the counterweight, a plurality of supplementary counterweight means adapted to be secured selectively in the cavity or recess and coordinated with the selected spacer means, and an inverted generally U-shaped overhead guard construction secured at its rear end to the counterweight and adjustable longitudinally in the overhead bridge portion thereof for connection to the counterweight in each of the latter's various adjustment locations relative to the rear chassis portion of the truck.

5. An overhead guard for industrial trucks comprising on one side thereof front and rear truck mounted inverted generally L-shaped aligned and facing rail portions, the upper generally horizontal legs of which terminate in overlapping relatively adjustable end portions providing on said side an inverted generally U-shaped guard rail, the front and rear legs of which rail are rigidly connected to respective front and rear truck body portions, said overlapping end portions being adjustable longitudinally in relation to each other so as to vary selectively the effective length of the guard rail for trucks varying in length between the locations of connection thereof to the front and rear portions of the truck, and wherein the rear truck body portion comprises an adjustable counterweight construction connected to the rear chassis portion of the lift truck, a plurality of spacer means varying in length and selectively connectible intermediate the rear chassis portion and the counterweight for selectively varying the spacing of the counterweight from said rear chassis portion, a recess or cavity formed in the interior body of the counterweight, and a plurality of supplementary counterweight means adapted to be secured selectively in the cavity or recess and coordinated with the selected spacer means.

6. In a lift truck, an overhead guard of inverted U-shaped construction, a counterweight construction secured to the rear end of the truck and adjustable to a plurality of selected locations longitudinal of the truck, said overhead guard being adjustable lengthwise in the overhead bridging portion thereof for non-pivotable connection to the counterweight at its various adjusted longitudinal locations, an operator's seat means mounted at an operator's station beneath the overhead guard, and means for adjusting the seat means from a forwardly facing operative position to a rearwardly facing non-operative position transversely outwardly of one side of the truck.

* * * * *